United States Patent [19]

Wacome et al.

[11] Patent Number: 4,575,525
[45] Date of Patent: Mar. 11, 1986

[54] REMOISTENABLE ADHESIVE COMPOSITIONS

[75] Inventors: Donald M. Wacome, Greenville, S.C.; Christopher T. Fazioli, Western Springs, Ill.; Vincent A. Lauria, Somerville, N.J.

[73] Assignee: National Starch and Chemical Corporation, Bridgewater, N.J.

[21] Appl. No.: 668,603

[22] Filed: Nov. 5, 1984

Related U.S. Application Data

[63] Continuation of Ser. No. 422,631, Sep. 24, 1982, abandoned.

[51] Int. Cl.$^4$ .............. C08L 3/02; C08J 3/02; C09J 3/06
[52] U.S. Cl. .................... 524/48; 524/734; 156/328; 156/336
[58] Field of Search ............. 524/27, 48, 732, 734; 156/328, 336

[56] References Cited

U.S. PATENT DOCUMENTS

| | | | |
|---|---|---|---|
| 2,808,381 | 10/1957 | Stone | 524/48 |
| 3,200,091 | 8/1965 | Sederlund et al. | 524/48 |
| 3,271,336 | 9/1966 | Warson et al. | 524/734 |
| 3,734,819 | 5/1973 | Knutson | 156/328 |
| 3,954,687 | 5/1976 | Wiest et al. | 524/48 |

FOREIGN PATENT DOCUMENTS 726927  3/1955  United Kingdom ............... 524/734

Primary Examiner—John Kight
Assistant Examiner—Nathan M. Nutter
Attorney, Agent, or Firm—Ellen T. Dec; Edwin M. Szala

[57] ABSTRACT

Remoistenable adhesive compositions are prepared from ethylene vinyl acetate resin latices which have been polymerized utilizing dextrin as the protective colloid. In a preferred embodiment of the invention, remoistenable adhesives characterized by superior adhesion to difficult stocks are prepared by post-addition of dextrin to the dextrin-emulsified ethylene vinyl acetate resin latex.

7 Claims, No Drawings

REMOISTENABLE ADHESIVE COMPOSITIONS

This application is a continuation of application Ser. No. 422,631, filed Sept. 24, 1982 and now abandoned.

The present invention is directed to a remoistenable adhesive composition, particularly a remoistenable adhesive for use as a front-seal in the manufacture of envelopes. The adhesive composition comprises a dextrin emulsified ethylene vinyl acetate copolymer to which other conventional components are post-added. The resulting adhesive, in its preferred embodiment, is characterized by superior adhesion to difficult stocks, in particular to rag stocks, bond or texturized paper stocks, without any loss in drying or gloss properties such as are normally associated with adhesives used on these stocks.

Conventional remoistenable adhesives for use as "front-seal" adhesives on envelopes have been prepared by the addition of dextrin, plasticizer and other additives to dextrin emulsified vinyl acetate homopolymers. These adhesives have been characterized by superior drying speeds and high gloss, properties particularly desirable for such applications; however, when applied to some types of difficult stocks, in particular the rag stocks or bond stocks containing large quantities of cotton fibers or when used on texturized stocks, they have exhibited reduced adhesion to the stocks. Thus the manufacturers of such envelopes have had to employ an adhesive based primarily on homo- or copolymers of polyvinyl acetate which has been emulsified with polyvinyl alcohol and to which additional polyvinyl alcohol and plasticizer are post-added. These adhesives have provided the required degree of adhesion to the difficult stocks but have suffered with respect to their drying and gloss properties when compared to the dextrin containing systems.

It is therefore an object of the present invention to provide a remoistenable adhesive composition suitable for adhering difficult stocks which adhesive composition retains the drying and gloss properties of the dextrin emulsified polyvinyl acetate adhesives of the prior art.

We have now found that if adhesives are prepared by post-addition of conventional additives to ethylene vinyl acetate copolymers which have been polymerized using dextrin as the emulsifier or protective colloid, the resulting adhesive provides a suitable fast-drying remoistening adhesive for envelope stocks. Moreover, when the adhesive is prepared using dextrin as one of the post-additives, the resulting adhesive provides a fiber tearing bond even on difficult stocks yet is fast drying and exhibits high gloss characteristics.

Thus, in accordance with the broadest embodiment of the invention, there is disclosed an adhesive composition comprising a dextrin emulsified ethylene vinyl acetate copolymer and 0.5 to 5% of a humectant. The resultant adhesives, while novel and faster drying than adhesive compositions containing post-added dextrin, do not possess the superior remoistening adhesion properties with respect to difficult stocks. The adhesives prepared in conjunction with the preferred embodiment of the invention will, therefore, contain in addition to the dextrin emulsified ethylene vinyl acetate copolymer and humectant, up to 40% of post added dextrin.

In formulating the adhesives of the invention, it is necessary to achieve a $T_g$ or film forming temperature within a critical range. It is generally accepted that polyvinyl acetate has a $T_g$ of 30° C. By addition of increasing amounts of ethylene, it is possible to lower the $T_g$ value. For use in the invention, we have found that sufficient ethylene should be added so as to reduce the $T_g$ to within a range of $+15°$ to $-10°$ C. At $T_g$ values above about 15°, the adhesion properties are not adequate while when the $T_g$ is reduced below about $-10°$ C., blocking becomes a problem. Blocking is an undesirable phenonmenon which results when the coated substrates, such as the envelopes, are stored and exposed to varying degrees of humidity resulting in the tendency of the adjacent surfaces of the stacked substrates to adhere to one another. The choice of the particular $T_g$ to be used in the adhesive formulation will depend, in part, on the desired end use (i.e. the stock to which the adhesive is to be applied) as well as on whether or not dextrin is post-added to the adhesive system. Thus, in the embodiment wherein no additional dextrin is added softer adhesive bases (i.e. those having $T_g$ values at the lower end of the range) may be desired.

As to the dextrin utilized herein, the dextrin may be derived from any of the available starch bases, including, but not limited to, waxy maize, waxy sorghum, sago, tapioca, potato, corn, sorghum, rice and wheat as well as the derivatives thereof. In all instances, however, the applicable starch base should be in ungelatinized form and should remain in that form throughout the subsequent dextrinization process.

In converting these starch bases into dextrins, one may employ any of the usual dextrinization procedures well known to those skilled in the art, including treatment of starch with either heat or acid or by any other means desired by the practitioner. It should be noted that when reference is made to "dextrins" in the process of this invention, we also contemplate as included therein the degraded starch products prepared either by means of a process wherein the applicable starches are converted with acids and/or oxidizing agents, in the presence of water, at superatmospheric pressures and temperatures in excess of about 212° F., or, by means of an enzyme conversion procedure utilizing such enzymes as alpha-amylase. Additional information relating to the dextrinization of starches, may also be obtained by reference to chapters XII–XIII of "Chemistry and Industry of Starch" edited by R. W. Kerr, published in 1950 by the Academic Press of New York, N.Y.

While the choice of the particular dextrin to be used is left to the practitioner, it is preferred that the same dextrin base used as the protective colloid in the polymerization process be used as the post-added dextrin component in formulating the adhesives of the preferred embodiment.

The adhesive polymer base is prepared by conventional ethylene vinyl acetate polymerization procedures with the one difference being the use of an aqeuous solution of dextrin as the emulsifier or protective colloid. The polymerization is then carried out in an aqueous medium under pressures less than about 130 atmospheres in the presence of a catalyst with the system being maintained by a suitable buffering agent, if necessary, at a pH of 2 to 6. The polymerization is performed at conventional temperatures from about 70° to 225° F., preferably from 120° to 175° F. for sufficient time to achieve a low monomer content, e.g. from about 1 to 8 hours, preferably from 3 to 7 hours, to produce a latex having less than 1.5, preferably less than 0.5 weight percent free monomer. Conventional batch, semi-continuous or continuous polymerization procedures may be employed and are taught, for example, in U.S. Pat. Nos. 3,708,388 and 4,164,488.

More specifically, a solution of the dextrin in water, typically at a concentration of 30 to 50% solids, is prepared in a polymerization vessel and a portion of the vinyl acetate monomer charged therein. After purging the reactor with nitrogen, the polymerization is then initiated by water soluble free radical initiator such as water soluble peracid or salt thereof, e.g. hydrogen peroxide, sodium peroxide, lithium peroxide, peracetic acid, persulfuric acid or the ammonium and alkali metal salts thereof, e.g. ammonium persulfate, sodium peracetate, lithium persulfate, potassium persulfate, sodium persulfate, etc. A suitable concentration of the initiator is from 0.05 to 5.0 weight percent and preferably from 0.1 to 3 percent based on the weight of the monomer.

The free radical initiator can be used alone and thermally decomposed to release the free radical initiating species or can be used in combination with a suitable reducing agent in a redox couple. The reducing agent is typically an oxidizable sulfur compound such as an alkali metal metabisulfite and pyrosulfite, e.g. sodium metabisulfite, potassium metabisulfite, sodium pyrosulfite, etc. The reducing agent is generally added towards the end of the polymerized and is used in an amount of from about 0.1 to 3 weight percent of the amount of polymer.

The ethylene content of the copolymer is determined by controlling the ethylene content of the aqueous polymerization medium. This may be accomplished by regulating the partial pressure of ethylene in the vapor phase over the medium, the temperature of polymerization and the degree of mixing between the vapor phase and the liquid medium. Generally, the polymerization, is performed at temperatures from 120° to 175° F. and, at these temperatures, ethylene partial pressures from 50 to 1,000, preferably from 250 to 750 psig. are sufficient to incorporate from 1 to 30, preferably from 5 to 25, weight percent ethylene in the polymer. The reaction medium is preferably agitated with a stirrer, however, other agitation can be used as sparging the liquid with recirculated ethylene from the vapor phase. In the preferred procedure, the ethylene partial pressures is maintained constant throughout the polymerization period so that this monomer is continuously supplied at a constant rate.

In addition to the required dextrin solution used as a protective colloid, other emulsifiers, generally of the nonionic and anionic oil-in-water variety may also be used in the polymerization reaction. When used, it is generally present in amounts of 0.1 to 1 percent of the monomers used in the polymerization and is added either entirely to the initial charge or continuously or intermittently during polymerization or as a post-reaction stabilizer.

The preferred copolymerization procedure is a modified batch processing wherein the major amounts of some or all the comonomers and emulsifier are charged to the reaction vessel after polymerization has been initiated. It is preferred to add the vinyl ester intermittently or continuously over the polymerization period which can be from 0.5 to about 10 hours, preferably from about 2 to about 6 hours.

The latices are produced and used at relatively high solids contents, e.g. between 35 and 75% although they may be diluted with water if desired. The preferred contents of total solids are from 40 to 70, and, most preferred, from 50 to about 68 weight percent. When used herein the term "solids" refers to the combined amounts of ethylene vinyl acetate resin, dextrin and other non-volatiles present in the latex.

The particle size of the latex can be regulated by the quantity and type of the emulsifying agent or agents employed. To obtain smaller particles sizes, greater amounts of emulsifying agents are used. As a general rule, the greater the amount of the emulsifying agent employed, the smaller the average particle size.

The humectant used herein may be any of those conventionally used in formulating remoistenable "front seal" adhesives. Typically included in this class are sugars; sorbitol; glycerine and related derivatives; propylene glycol and similar related glycols; and the glycol ethers. These humectants are used is the adhesive formulations at levels of about 0.5 to 5% by weight of the total adhesive and formulation.

In preparing the adhesive composition, an aqueous solution of the dextrin may be prepared and added to the ethylene vinyl acetate latex or the dry dextrin added directly to the latex. The adhesive composition is then heated and maintained at a temperature of about 160°–180° F. with agitation for a period sufficient to ensure complete dissolution. Any other additives which are to be employed would be added at this point and the resulting mixture then diluted with additional water, if necessary, to the desired viscosity, generally in the range of about 2,000 to 11,000 cps., preferably about 6000 cps. In the embodiment wherein dextrin is not post-added, it may be necessary to add a thickener (e.g. polyacrylamide, carboxymethyl cellulose, hydroxyethylcellulose, etc.) in order to obtain a viscosity within these limits.

When used in the final adhesive composition, the post-added dextrin will be present in an amount up to about 40% generally from about 8 to 25% and preferably from 15 to 20%, by weight of the formulation with the humectant and dextrin emulsified ethylene vinyl acetate resin comprising the remainder of the composition. Various optional additives, such as plasticizers, preservatives, thickeners, bleaching agents, etc. may also be present in the adhesive compositions in order to modify certain characteristics thereof.

Although the humectant component and the optional additional dextrin have been referred to as being "post-added", it should be recognized that the post-addition is merely the most convenient and generally accepted method of formulating "front" seal adhesives and that it is possible to add the humectant and the additional dextrin directly to the monomer charge prior to the actual polymerization.

In the examples that follow, an adhesive was prepared from ethylene vinyl acetate base which had been polymerized using dextrin as a protective colloid in accordance with the following basic procedure. In the examples, the amount of ethylene to achieve to desired $T_g$ was varied. ($T_g$ values were determined by differential thermal analysis using a DuPont Model 910 Differential Scanning Calorimeter.)

A premix cooker was charged with 13,000 gm. water and 9,000 gm. dextrin dissolved therein with agitation. Then 60 gm. Aerosol OT surfactant was added with a 8750 gm. portion of vinyl acetate and this initial change transferred to a reactor. The reactor was purged with nitrogen and the temperature raised to 150° F. while ethylene was added to a pressure of 450 pounds. Polymerization was initiated and maintained by a slow addition of a solution of 200 gm. sodium bicarbonate and 260 gm. sodium persulfate in 2400 gm. water. The temperature was allowed to rise to 165° F. and ethylene pressure to 500 pounds. When the polymerization initiated the remaining 17500 gm. vinyl acetate were then slowly added over a four hour period. The reaction was completed to less than 0.5% residual monomer by addition of a redox system comprising 30 grams tertiary butyl hydroperoxide and 30 grams sodium formaldehyde sulfoxalate in 175 grams water. The latex was stripped of residual ethylene, cooled and a bacteriocide added. The resultant latex had a total solids content of 64–67%, a $T_g$ of 8 and a viscosity of 1200 cps.

EXAMPLE I

In this example, a variety of remoistenable adhesive compositions were prepared using ethylene vinyl acetate polymers prepared as above and having a range of ethylene contents as manifested by varying $T_g$ values. As a control, a similar adhesive was prepared using dextrin emulsified polyvinyl acetate to which a plasticizer was also added.

|  | A | B | C | D | E | F |
|---|---|---|---|---|---|---|
| Homopolymer | 100 | — | — | — | — | — |
| EVA ($T_g = +11$) | — | 100 | — | — | — | — |
| EVA ($T_g = +6$) | — | — | 100 | — | — | — |
| EVA ($T_g = +2$) | — | — | — | 100 | — | — |
| EVA ($T_g = -1$) | — | — | — | — | 100 | — |
| EVA ($T_g = -8$) | — | — | — | — | — | 100 |
| Amioca Dextrin | 22.8 | 22.8 | 22.8 | 22.8 | 22.8 | 22.8 |
| Alkyd resin plasticizer | 2.5 | — | — | — | — | — |
| Propylene Glycol | 2.6 | 2.6 | 2.6 | 2.6 | 2.6 | 2.6 |

When tested for adhesion on texturized stocks and rag stocks, the sample designated B exhibited improved adhesion to the substrates when contrasted to the Control Sample A, while the remaining Samples C–F exhibited even better bonds with more fiber tearing and better adhesion. When tested for blocking resistance under high humidity conditions, the Control and Samples B, C and D exhibited satisfactory non-blocking while Samples E and F showed some reduction in blocking resistance.

EXAMPLE II

In this example, the ethylene vinyl acetate polymer having a $T_g$ of +2 and designated previously as Sample C was further tested using various concentrations of post-added dextrin. in Samples C and G, additional water (about 6–13 parts) were added to dilute the viscosity to about 6000 cps. In Sample H, no additional water was added and the viscosity of the adhesive was 3000 cps. (The amount of propylene glycol used was determined based on the amount of dextrin in the composition.)

|  | G | C | H |
|---|---|---|---|
| EVA ($T_g = +2$) | 100 | 100 | 100 |
| Amioca Dextrin | 43.4 | 22.8 | 9.4 |
| Propylene Glycol | 3.0 | 2.6 | 1.2 |

When tested and compared against Sample C, the adhesion of Sample G was acceptable and better than that of the Control in Example I but not as good as observed for Sample C. Similarly, the blocking resistance was reduced over that observed for Sample C, due to the increased dextrin concentration.

Sample H exhibited satisfactory blocking resistance but was reduced with respect to adhesion on difficult stocks due to its poorer remoistening properties.

EXAMPLE III

Two additional adhesive formulations were prepared using dextrin emulsified ethylene vinyl acetate latices having a $T_g$ of −1. In one formulation, 1.0 part sucrose (per 100 parts latex) was added and to the second 2 parts propylene glycol were used. Both adhesives provided some fiber tear on white wove stocks with less tear when tested on the difficult rag type stocks.

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

We claim:
1. Remoistenable adhesive compositions comprising:
   (a) 55–99.5% of an ethylene vinyl acetate resin latex having a $T_g$ of 15° to −10° C., the latex having been emulsified in an aqueous solution of dextrin;
   (b) 0.5–5% of a humectant; and
   (c) 0–40% dextrin.
2. The adhesive composition of claim 1 wherein the humectant is selected from the group consisting of sugars, sorbitol, glycerine and related derivatives, propylene glycol and related glycols and glycol ethers.
3. The adhesive composition of claim 1 wherein a dextrin is added in the dextrin emulsified ethylene vinyl acetate resin latex in an amount of 8 to 25% by weight of the adhesive.
4. The adhesive composition of claim 1 wherein dextrin is added in an amount of 15 to 20% by weight.
5. The adhesive composition of claim 1 wherein the dextrin is amioca dextrin.
6. In a method for the preparation of a remoistenable adhesive composition comprising ethylene vinyl acetate resin latices and humectants, the improvement which comprises prolymerizing the ethylene vinyl acetate in the presence of an aqueous solution of dextrin as a protective colloid.
7. In a method for the preparation of a remoistenable adhesive composition comprising ethylene vinyl acetate resin latices and humectants, the improvement which comprises polymerizing the ethylene vinyl acetate in the presence of an aqueous solution of dextrin as a protective colloid and post-adding up to 40% additional dextrin to the adhesive thereby providing an adhesive characterized by superior adhesion to difficult stocks.

* * * * *

UNITED STATES PATENT AND TRADEMARK OFFICE
CERTIFICATE OF CORRECTION

PATENT NO. : 4,575,525

DATED : March 11, 1986

INVENTOR(S) : Donald M. Wacome; Christopher T. Fazioli, Vincent A. Lauria

It is certified that error appears in the above-identified patent and that said Letters Patent are hereby corrected as shown below:

Column 3, Line 26, change "polymerized" to --polymerization--.

Column 4, Line 16, change "is" to --in--.

Column 5, Lines 52, 53 and 62, change "C" to --D--.

Column 5, Line 53, change "in" to --In--.

Signed and Sealed this

Fourteenth Day of October, 1986

[SEAL]

Attest:

DONALD J. QUIGG

Attesting Officer

Commissioner of Patents and Trademarks